(No Model.)
M. JAKOBSON.
TANDEM ATTACHMENT FOR BICYCLES.
No. 552,907. Patented Jan. 14, 1896.
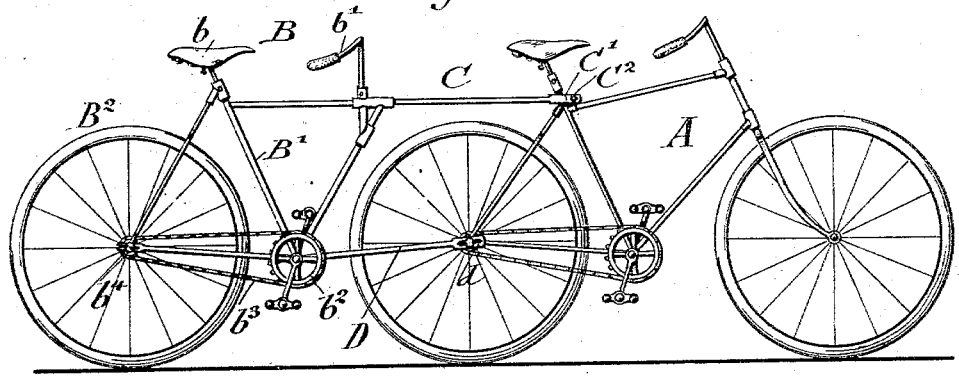
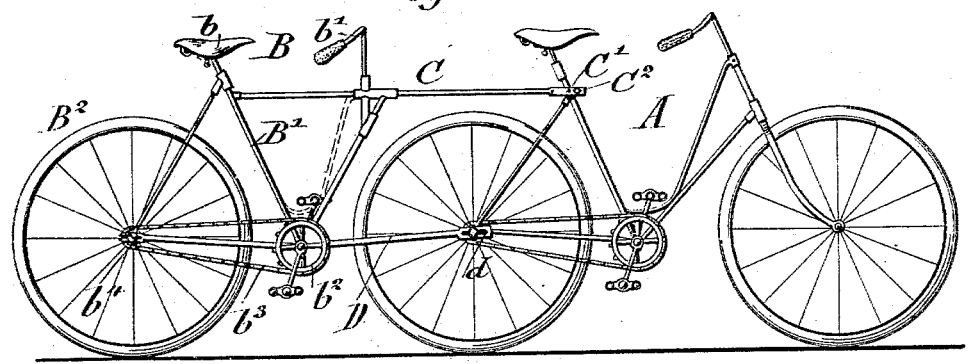
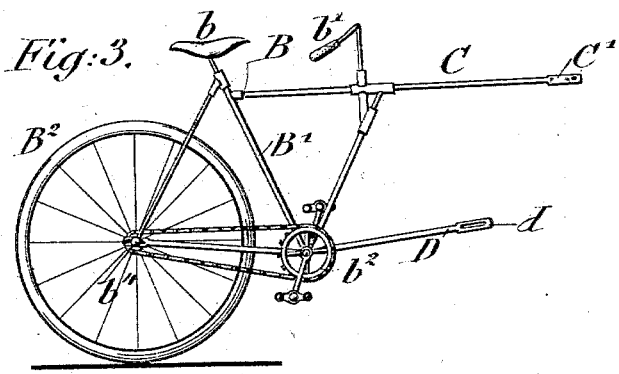
WITNESSES:
INVENTOR
Max Jakobson
BY
ATTORNEYS.

UNITED STATES PATENT OFFICE.

MAX JAKOBSON, OF NEW YORK, N. Y.

TANDEM ATTACHMENT FOR BICYCLES.

SPECIFICATION forming part of Letters Patent No. 552,907, dated January 14, 1896.

Application filed March 29, 1895. Serial No. 543,644. (No model.)

*To all whom it may concern:*

Be it known that I, MAX JAKOBSON, a citizen of the United States, residing in the city, county, and State of New York, have invented certain new and useful Improvements in Tandem Attachments for Bicycles, of which the following is a specification.

This invention has reference to an improved attachment to that class of bicycles known as "safety-bicycles" by which any safety-bicycle can be changed into a double cycle or tandem bicycle, so that either two gentlemen or a gentleman and lady, or two ladies, can ride together in tandem; and the invention consists of a tandem attachment to bicycles which comprises an auxiliary frame provided with a pair of pedals, a fork in front of the pedals, an auxiliary wheel and chain connection between the pedal-shaft and the auxiliary wheel, a forwardly-extending brace having a forked front end, and means for connecting the fork and the brace to the frame of any suitable bicycle, as will be fully described hereinafter, and finally pointed out in the claims.

In the accompanying drawings, Figure 1 represents a side elevation of a man's safety bicycle with my improved tandem attachment applied thereto. Fig. 2 is a side elevation of my improved tandem attachment connected with a girl's bicycle. Fig. 3 is a side elevation of my improved tandem attachment shown as detached. Fig. 4 is a plan view of the upper connecting-brace, and Fig. 5 is a plan view of the auxiliary-fork connection by which the frame of the tandem attachment is connected with the rear part of the frame of the main bicycle.

Similar letters of reference indicate corresponding parts.

Referring to the drawings, A represents a safety-bicycle of any approved construction. B represents the tandem attachment, which consists of an auxiliary frame B' and a single wheel $B^2$, which is of the same size and construction as the wheels of the safety-bicycle A. The auxiliary frame B' is provided with the usual seat $b$ and handle-bar $b'$, and at the lower part with a sprocket-wheel $b^2$ and chain connection $b^3$, by which the auxiliary pedal-shaft is connected with sprocket-wheel $b^4$ on the axle of the auxiliary wheel $B^2$.

The frame B' of the tandem attachment is provided at its upper part with a horizontally-extending brace C that is provided with a forked front end C', which is applied to the upper part of the frame of the main bicycle A, and connected thereto by a suitable bolt $C^2$, as shown clearly in Fig. 4.

Any suitable means by which the forward-extending brace can be attached to the frame of the main bicycle can be used without departing from the spirit of my invention.

The frame B' of the tandem attachment is further provided in front of the pedal-shaft with a forward fork D, which is provided with enlarged and longitudinally-slotted front ends $d$, which are applied to the rear fork of the main bicycle A by loosening the connecting-bolts of the same and applying the same again after the slotted front end $d$ of the large fork D is applied. When the forward-extending brace C and the forward-extending fork D of the frame of the tandem attachment are connected with the rear fork of the frame of the main bicycle, a tandem cycle is formed which can be used either by two men or by a lady and gentleman, or by two ladies, in which latter case the frame of the tandem attachment has to correspond to the frame of the main bicycle, as indicated in dotted lines in Fig. 2. By my improved tandem attachment to bicycles two persons of the same or of different sexes can at any time go out in tandem, as it requires only the comparatively cheap and simple attachment described to change the bicycle into a tandem cycle. My improved tandem attachment can also be used with great advantage in schools for teaching cycle-riding and by stores which rent out cycles, as thereby two friends can go out riding together in tandem without requiring two bicycles.

Having thus described my invention, I claim as new and desire to secure by Letters Patent—

1. A three-wheeled tandem-cycle, consisting of an ordinary safety-bicycle, a tandem-attachment having a single wheel and provided with a forwardly-extending brace at the upper part, and with a fork at the lower part thereof, and means for detachably connecting the brace and fork to the rear-fork of the main bicycle, substantially as set forth.

2. A three-wheeled tandem-cycle, consisting of an ordinary safety-bicycle, a tandem-attachment having a single wheel and consisting of an ordinary frame provided with a seat and handle-bar, a forwardly-extending brace at the upper part of the auxiliary frame, a forwardly-extending fork at the lower part of the frame, a pedal-shaft and pedals, sprocket-mechanism between the pedal shaft and the wheel of the tandem-attachment, and means for detachably connecting the brace and fork of the tandem-attachment with the rear-fork of the main-bicycle, substantially as set forth.

In testimony that I claim the foregoing as my invention I have signed my name in presence of two subscribing witnesses.

MAX JAKOBSON.

Witnesses:
PAUL GOEPEL,
S. E. SMITH.